United States Patent
Hartl et al.

(10) Patent No.: US 9,348,811 B2
(45) Date of Patent: May 24, 2016

(54) OBTAINING DATA FROM ELECTRONIC DOCUMENTS

(75) Inventors: Florian Hartl, Walldorf (DE); Yingjie Miao, Menlo Park, CA (US)

(73) Assignee: SAP SE, Walldorf (DE)

( * ) Notice: Subject to any disclaimer, the term of this patent is extended or adjusted under 35 U.S.C. 154(b) by 1056 days.

(21) Appl. No.: 13/452,791

(22) Filed: Apr. 20, 2012

(65) Prior Publication Data

US 2013/0282361 A1 Oct. 24, 2013

(51) Int. Cl.
*G06F 17/27* (2006.01)
*G06F 17/21* (2006.01)

(52) U.S. Cl.
CPC .................................. *G06F 17/278* (2013.01)

(58) Field of Classification Search
USPC ................................................................ 704/9
See application file for complete search history.

(56) References Cited

U.S. PATENT DOCUMENTS

| | | | | |
|---|---|---|---|---|
| 5,983,170 A * | 11/1999 | Goodman | ............. | G06F 17/271 704/9 |
| 6,924,828 B1 * | 8/2005 | Hirsch | ............. | G06F 17/30899 704/9 |
| 6,981,040 B1 * | 12/2005 | Konig et al. | ................... | 709/224 |
| 7,587,309 B1 * | 9/2009 | Rohrs et al. | ...................... | 704/10 |
| 8,731,995 B2 * | 5/2014 | Sun | ........................ | G06Q 10/10 704/9 |
| 8,818,788 B1 * | 8/2014 | Mihalik | ............... | G06F 17/2785 704/1 |
| 8,838,618 B1 * | 9/2014 | Wu et al. | ........................ | 707/750 |
| 2003/0078899 A1 * | 4/2003 | Shanahan | ......... | G06F 17/30707 706/8 |
| 2003/0120649 A1 * | 6/2003 | Uchino et al. | .................... | 707/5 |
| 2005/0065909 A1 * | 3/2005 | Musgrove et al. | ................. | 707/2 |
| 2007/0027672 A1 * | 2/2007 | Decary | ................. | G06F 17/278 704/7 |
| 2007/0067157 A1 * | 3/2007 | Kaku et al. | ....................... | 704/10 |
| 2007/0078850 A1 * | 4/2007 | Aziz et al. | .......................... | 707/6 |
| 2009/0063247 A1 * | 3/2009 | Burgess et al. | .................. | 705/10 |
| 2009/0240638 A1 * | 9/2009 | Kirpal | ............... | G06F 17/30887 706/12 |
| 2009/0319342 A1 * | 12/2009 | Shilman et al. | .................. | 705/10 |
| 2010/0299322 A1 * | 11/2010 | Zhang | ........................... | 707/722 |
| 2011/0099003 A1 * | 4/2011 | Isozu | ................. | G06F 17/30011 704/9 |
| 2011/0106746 A1 * | 5/2011 | Ventilla | ................... | G06Q 10/10 706/50 |
| 2013/0158981 A1 * | 6/2013 | Ceylan | ................ | G06F 17/3089 704/9 |

OTHER PUBLICATIONS

SAP, BusinessObjects ThingFinder™ SDK Getting Started Guide, BusinessObj ThingFinder™ SDK 4.3, 2008 Business Objects, 518 pages.
Turmo, Jordi, et al.; Adaptive Information Extraction, ACM Computing Surveys, vol. 38, No. 2, Article 4, Publication date: Jul. 2006, 47 pages.

(Continued)

*Primary Examiner* — Olujimi Adesanya
(74) *Attorney, Agent, or Firm* — Fish & Richardson P.C.

(57) ABSTRACT

Techniques for obtaining information from an electronic document include accessing a set of related electronic documents; identifying a product page associated with the set of related electronic documents using a page recognition model, the product page comprising a plurality of terms; filtering the plurality of terms into a first set of terms and a second set of terms, the first set of terms and the second set of terms including different terms of the plurality of terms, each term in the first set of terms identified as potentially being associated with a product name, and each term in the second set of terms identified as not being associated with a product name; and identifying each term in the first set of terms as being associated with a product name or not being associated with a product name with a name recognition model.

26 Claims, 6 Drawing Sheets

(56) References Cited

OTHER PUBLICATIONS

Kim, Young-gon, et al.; Modified Naïve Bayes Classifier for ECatalog Classification, in J. Lee et al. (Eds.): DEECS 2006, LNCS 4055, pp. 246-257, 2006, 12 pages.

Fong, Simon, One Designing a Market Monitoring Web Agent System, in Proceedings of iiWAS2008, 6 pages.

Thet, Tun Thura; Filtering Product Reviews from Web Search Results, Wee Kim Wee School of Communication and Information Nanyang Technological University, Singapore, 3 pages.

* cited by examiner

```
▼<doc>
  <float name="score">1.0</float>
  <float name="boost">0.23037158</float>
  <str name="companyName">unknown</str>
▼<str name="content">
  <TITLE> Safeway Community - About Tony-Produce - Welcome to our community - we're glad you're here!<IMG>
  mail Savings. Search. <IMG><LINK><ALT> Go. <LINK> Our Store. <LINK> Recipes and Meals. <LINK> Healthy Li
  <LI><LINK> Our Blog. Community. User Search. <LINK> turn on suggestions. <ALT> Tony-Produce. Tony-Produc
  since 1993<NS> In 1996, I joined forces with Safeway and began producing the free "Fresh Ideas" magazine
  and personal experiences. Recent Posts by Tony-Produce. Subject. Views. Posted. <LINK> Tuscan Bread Sala
  <LINK> Our Blog. <TD> 36. 02-24-2012. 04:17 PM. <LINK> Organics and Produce. <ALT> Message contains an i
  Visited. 02-28-2012. 10:52 AM. <TD> Total Messages Posted. <TD> 153. <TD> Total Tags. <TD> 941. Contact.
  Bread Salad.jpg. <IMG><LINK><ALT> OrganicsProduce.jpg. <IMG><LINK><ALT> ShelfLifeProduce.jpg. <IMG><LINK>
  vegetables. <LI><LINK> Produce. <LI><LINK> Recipes. <LI><LINK> Summer. <LI><LINK> healthy. <LI><LINK> side_di
  <LI><LINK> shopping_tips. <LI><LINK> snacking. <LI><LINK> veggies. <LI><LINK> desserts. <LI><LINK> nutrition. <LI><LINK> food_tips. <LI><LINK> salads.
  <LI><LINK> olive_oil. <LI><LINK> chicken. --> This IFrame contains information of the footer.
  browser does not support IFrames --> This IFrame contains information of the footer.
</str>
<str name="digest">f3002035lc86d5c23807b56f23b46fa8</str>
<str name="host">community.safeway.com</str>
▼<str name="id">
  http://community.safeway.com/t5/user/viewprofilepage/user-id/15
</str>
<str name="numberOfImages">16</str>
<str name="numberOfListEntries">37</str>
<str name="numberOfTableEntries">27</str>
<str name="numberOfTags">1188</str>
<str name="segment">20120228145319</str>
▼<str name="title">
  <TITLE> Safeway Community - About Tony-Produce - Welcome to our community - we're glad you're here!N
</str>
<str name="trainingExample">no</str>
<date name="tstamp">2012-02-28T22:54:54.362Z</date>
▼<str name="url">
  http://community.safeway.com/t5/user/viewprofilepage/user-id/15
</str>
</doc>
```

OBTAINING DATA FROM ELECTRONIC DOCUMENTS

TECHNICAL BACKGROUND

This disclosure relates to obtaining data from electronic documents and, more particularly, obtaining data from electronic documents using an adaptive learning machine.

BACKGROUND

Data can be obtained from electronic documents. Obtaining data can involve obtaining information from structured, semi-structured, or unstructured electronic documents. Obtaining information from a document can include identifying names of entities, such as organizations, people, places, products, or the like, in the document. To obtain information from a document, a set of highly accurate rules that obtain the document's contents may be used. Such rules typically handle highly structured documents, such as product catalogs and telephone directories. The web, however, largely consists of unstructured web pages and documents, and obtaining information from unstructured web pages and documents using such rules can be difficult.

SUMMARY

This disclosure describes systems, methods, apparatus, and computer-readable media for obtaining information, such as product names, from electronic documents using an adaptive learning machine including, for example, the features of accessing the set of related electronic documents; identifying a product page associated with the set of related electronic documents using a page recognition model, the page recognition model generated based on a first machine learning algorithm, and the product page including a plurality of terms; filtering the plurality of terms into a first set of terms and a second set of terms, the first set of terms and the second set of terms including different terms of the plurality of terms, each term in the first set of terms identified as potentially being associated with a product name, and each term in the second set of terms identified as not being associated with a product name; and identifying each term in the first set of terms as being associated with a product name or not being associated with a product name with a name recognition model, the name recognition model generated based on a second machine learning algorithm.

In a first aspect combinable with any of the general embodiments, identifying a product page associated with the set of related electronic documents using a page recognition model includes generating the page recognition model by accessing an electronic document; determining features associated with the electronic document; receiving input specifying a label for the electronic document; and generating the page recognition model using the labeled electronic document and the features as a training set.

In a second aspect combinable with any of the previous aspects, identifying each term in the first set of terms as being associated with a product name or not being associated with a product name with a name recognition model includes generating the name recognition model by extracting one or more terms from an electronic document; determining features associated with the one or more terms; receiving input specifying a label for the one or more terms; and generating the name recognition model using the labeled terms and the features as a training set.

In a third aspect combinable with any of the previous aspects, identifying a product page includes accessing an electronic document associated with the set of related electronic documents; determining features associated with the electronic document; and analyzing the features to determine whether the electronic document is a product page using the page recognition model.

In a fourth aspect combinable with any of the previous aspects, determining features associated with the electronic document includes analyzing a uniform resource locator, structure, and content associated with the electronic document.

In a fifth aspect combinable with any of the previous aspects, analyzing the structure associated with the electronic document includes determining at least one of amount of text, length of the longest text section, length of link texts, average link length, average list entry length, average table entry length, number of links, images, tables, or markup language tags, headlines of tables or lists, or a link associated with an image, list, table, or headline in the electronic document.

In a sixth aspect combinable with any of the previous aspects, filtering the plurality of terms into a first set of terms and a second set of terms includes parsing text in the product page into the plurality of terms; for each of the plurality of terms, determining a type of the term; and identifying the term as belonging in the first set of terms or the second set of terms based on the type of the term.

In a seventh aspect combinable with any of the previous aspects, the type of the term includes at least one of a noun, a verb, an adverb, an adjective, a number, or a symbol.

In an eight aspect combinable with any of the previous aspects, identifying each term of the first set in terms as being associated with a product name or not being associated with the product name includes for each term in the first set of terms, determining one or more features associated with the term and a noun phrase that includes the term; and determining, with the name recognition model, whether the term is associated with the product name or not associated with the product name based on the one or more features.

In a ninth aspect combinable with any of the previous aspects, determining one or more features associated with the term includes parsing text in the product page into one or more segments; for each segment, determining a type of the segment; and associating the type of the segment with the term.

In a tenth aspect combinable with any of the previous aspects, the type of the segment comprises at least one of a link, a headline, a list entry, a table entry, or a sentence.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIG. 4 illustrates example result data obtained from analyzing a markup language document for a web page.

DETAILED DESCRIPTION

In a general embodiment of the present disclosure, an adaptive learning machine obtains information from electronic documents. An adaptive learning machine can obtain information from textual descriptions in electronic documents where the textual descriptions are unstructured. Electronic documents can include web pages and other text documents, such as WORD documents and PDF documents. The information can include information relating to entities, such as organizations, people, places, products, or the like. For example, the adaptive learning machine can identify product names from a company's website. The website may include a set of related electronic documents. To identify product names, the adaptive learning machine identifies a product page associated with the company website using a page recognition model. The page recognition model is generated based on a machine learning algorithm that uses electronic documents that have been labeled to indicate whether the electronic document is a product page and features associated with the electronic document. After identifying a product page, the adaptive learning machine identifies one or more terms in the product page that specifies a product name using a name recognition model. The name recognition model is generated based on a machine learning algorithm that uses terms that have been labeled to indicate whether the terms specify a product name and features associated with the terms.

Figure 1:
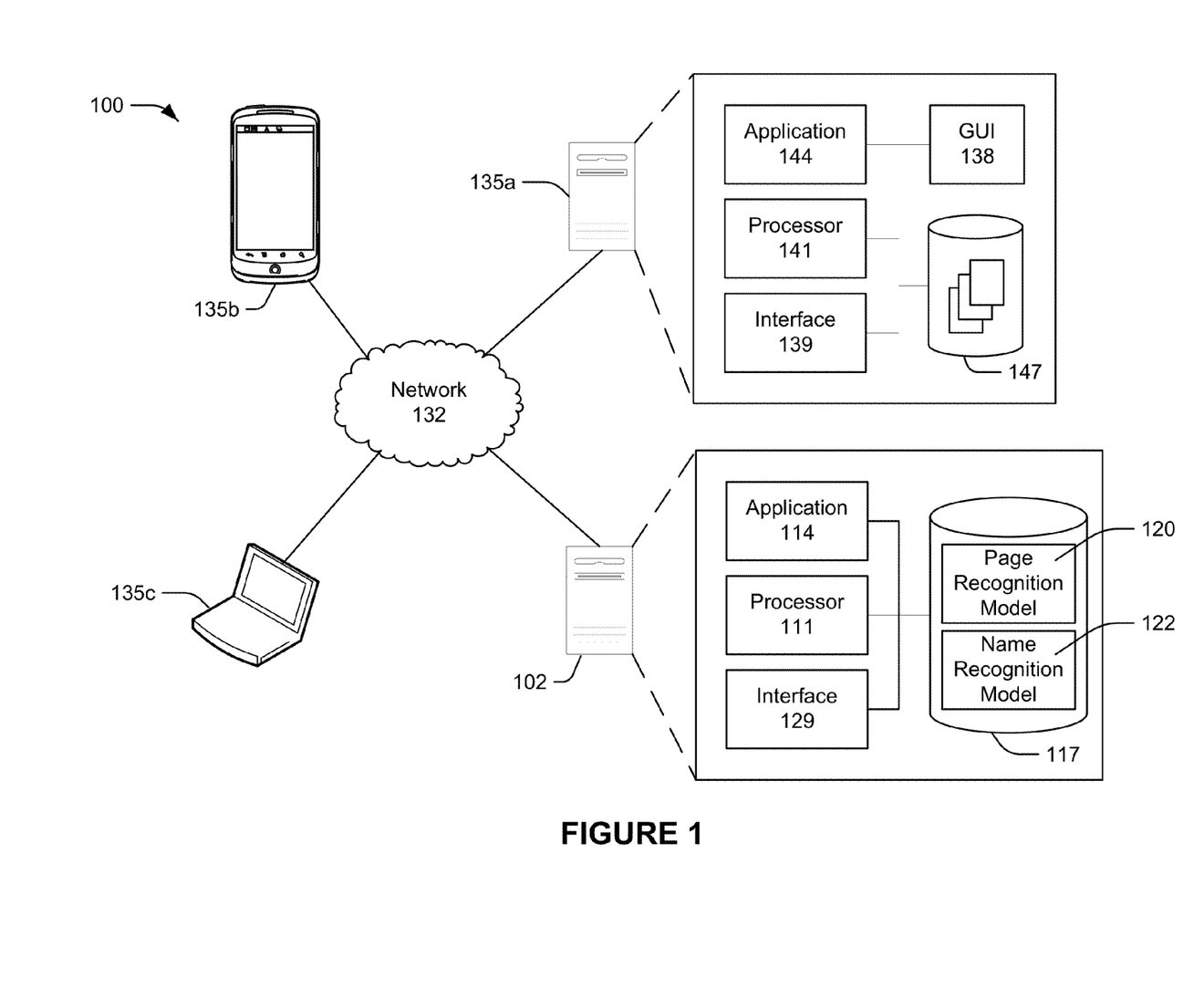
FIG. 1 illustrates an example distributed computing system operable to obtain information from electronic documents using an adaptive learning machine.

FIG. 1 illustrates an example distributed computing system 100 operable to obtain data from electronic documents using an adaptive learning machine 102. In some embodiments, the adaptive learning machine 102 includes a support vector machine (SVM) that analyzes data and recognizes patterns, and may be used for classification and regression analysis. For example, the adaptive learning machine 102 may receive inputs and predict, for each given input, which of two possible classes includes the input. In other words, the adaptive learning machine 102 as an SVM may be a classifier that provides a binary output (e.g., tool passage or no tool passage). Typically, a support vector machine constructs a point, line, plane, or hyperplane in a one, two, three, four or higher (including infinite) dimensional space to act as a classifier or model. The line may be replaced with a curve or a set of lines or curves, the plane with a manifold or set of planes or manifolds, and the hyperplane with a set of hyperplanes, which can be used for classification, regression, or other tasks such as ranking and anomaly detection. In general, the adaptive learning machine builds classification and regression models using a set of labeled data.

Turning to the example implementation of FIG. 1, the illustrated environment 100 includes or is communicably coupled with the adaptive learning machine 102 and one or more clients 135, at least some of which communicate across network 132. In general, environment 100 depicts an example configuration of a system capable of providing stateful execution of stateless applications in a substantially transparent way, as well as dynamically determining the particular application's mode of operation in response to requests from its clients 135.

In general, the adaptive learning machine 102 may be a server that stores one or more hosted applications 114, where at least a portion of the hosted applications 114 are executed via requests and responses sent to users or clients within and communicably coupled to the illustrated environment 100 of FIG. 1. An example of a hosted application 114 is a data extraction application based on adaptive learning. An example of a data extraction application is a product name identification application. The product name identification application is executed by the adaptive learning machine 102 to identify product names in electronic documents.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store a page recognition model 120 and a name recognition model 122 that are used by the server 102 to identify product pages and product names in the product pages. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
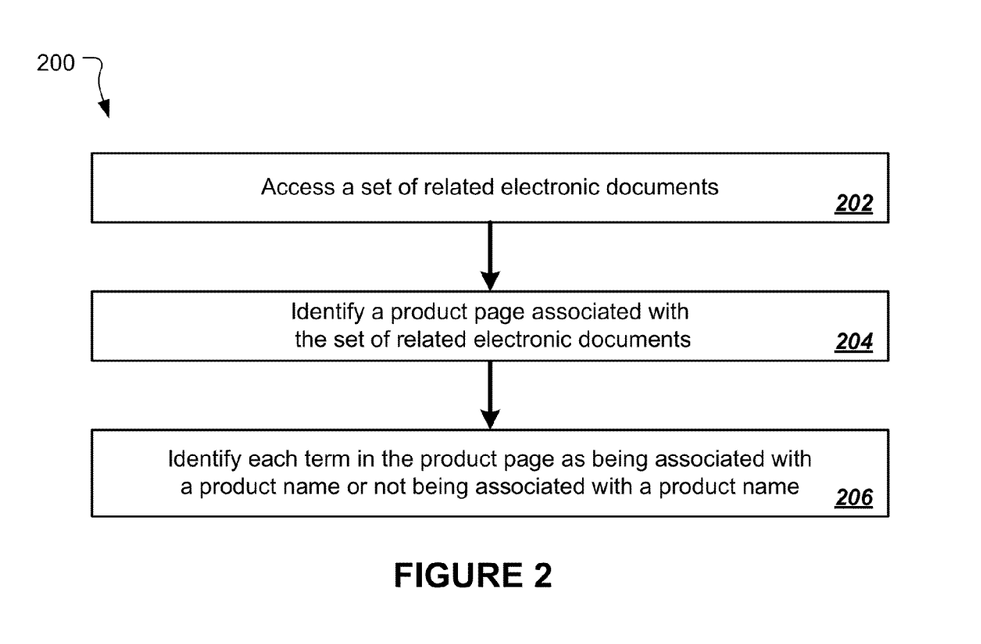
FIG. 2 illustrates an example flowchart 200 for obtaining information from electronic documents using an adaptive learning machine.

FIG. 2 illustrates an example flowchart 200 for obtaining information, such as product names, from electronic documents using an adaptive learning machine. The adaptive learning machine can be a system of one or more computers that perform the process 200. For purposes of illustration, the process 200 will be described with respect to a computing system that includes an adaptive learning machine, e.g., the adaptive learning machine 102 of FIG. 1, that performs the process 200.

In FIG. 2, the adaptive learning machine accesses a set of related electronic documents, such as a website, at step 202. A website may be a set of related web pages that contain content, such as text, images, audio, video, etc. The website may be hosted on one or more web servers that are accessible by the adaptive learning machine via a network, such as the Internet or a private local area network, through an Internet address known as a uniform resource locator (URL). The website may be associated with a company that provides products to customers. The adaptive learning machine accesses the website by retrieving a web page associated with the website. For example, the adaptive learning machine may access the website by retrieving a home page, an index page, or a main web page of the website.

The adaptive learning machine identifies a product page associated with the website at step 204. A product page may be a web page that includes a list or an overview of products provided by the company associated with the website. A website can include any number of product pages. The adaptive learning machine can analyze one or more of the product pages to obtain information from the website.

After the adaptive learning machine identifies a product page associated with the website, the adaptive learning machine analyzes the product page to obtain information, such as product names, from the product page. To obtain product names from the product page, the adaptive learning machine identifies each term in the product page as being associated with a product name or not being associated with a product name at step 206.

Figure 3:
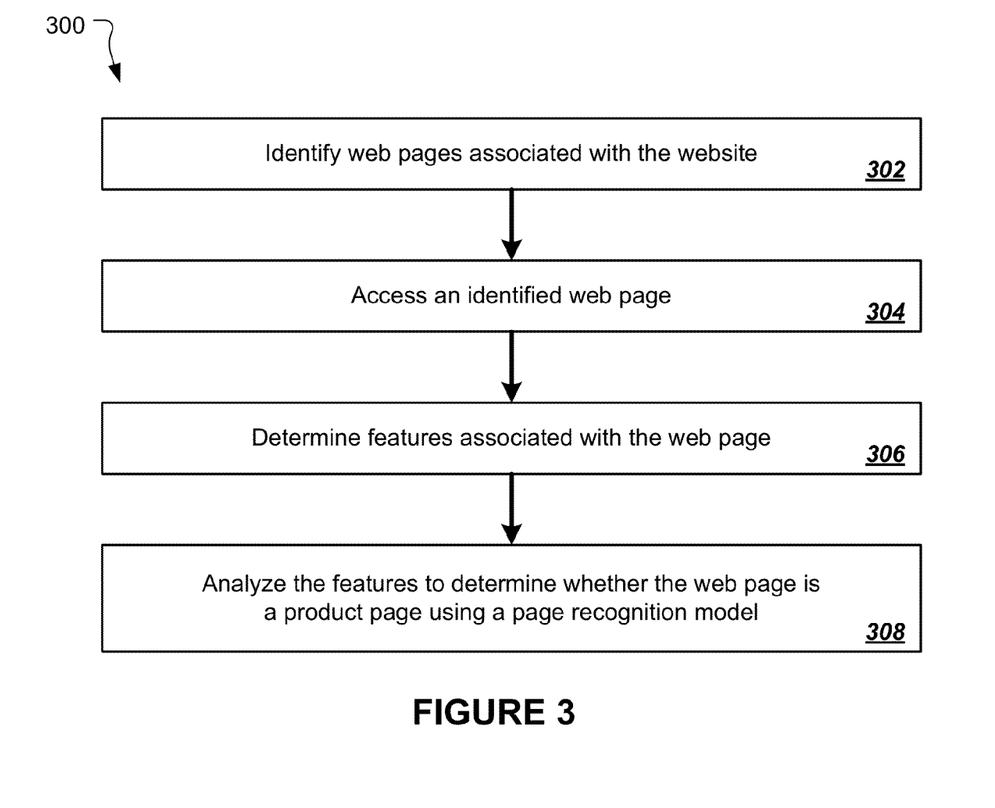
FIG. 3 illustrates an example flowchart 300 for identifying a product page.

FIG. 3 illustrates an example flowchart 300 for identifying a product page. To identify a product page, web pages associated with the website are identified at step 302. The adaptive learning machine may use any suitable algorithm or application that browses the website to identify the web pages associated with the website. For example, the adaptive learning machine may use a website crawling program that identifies the URLs of the web pages associated with the website.

At step 304, an identified web page is accessed. In some implementations, a website crawling program accesses each identified web page and outputs the content of the web page to the adaptive learning machine. In some implementations, the adaptive learning machine accesses the web page using the web page's URL. The adaptive learning machine then determines features associated with the web page at step 306. To determine the features associated with the web page, the adaptive learning machine may analyze the URL, the structure, the content of the web page, and/or the content in combination with the structure of the web page.

The adaptive learning machine may analyze the URL of the web page to determine one or more features associated with the web page. The features determined by analyzing the URL may include, for example, whether certain terms are included in the URL, where certain terms appear in the URL, or what type of page is specified by the URL. For example, the adaptive learning machine may determine whether a term, such as "products," is included in the URL of the web page. The adaptive learning machine may determine whether the term "products" appears at the end of the URL. As another example, the adaptive learning machine may determine whether the URL indicates that the web page is a home page or index page of the company website. A home page or index page may be the initial or main web page of the company website. Other features may be determined from the URL as an alternative to or in addition to those described above.

The adaptive learning machine may analyze the structure of the web page to determine one or more features associated with the web page. The adaptive learning machine may analyze the structure of the web page by analyzing the markup language document for the web page and identifying certain markup language tags. Briefly, FIG. 4 illustrates example result data 400 obtained from analyzing a markup language document for a web page. As shown in FIG. 4, the markup language 402 includes content, e.g., displayed text and images, and markup language tags, e.g., tags such as <IMG>, <LINK>, and <LI>. From the markup language 402, the adaptive learning machine can obtain information about the web page, such as the number of images 404, the number of list entries 406, the number of table entries 408, the number of markup language tags 410, and the title of the web page 412. The adaptive learning machine can determine features based on the information obtained from the markup language document. The features determined by analyzing the structure of the web page may include, for example, the amount of text on the page, the length of the longest text section of the page, the length of link texts, the average link length, the average list entry length, the average table entry length, the number of tags, links, images, tables, or html tags on the page, the headline of any tables or lists, or the link or links associated with an image, list, table, or headline in the page. Other features may be determined from the structure of the web page as an alternative to or in addition to those described above.

The adaptive learning machine may analyze the content of the web page to determine one or more features associated with the web page. The adaptive learning machine may analyze the content of the web page by parsing the displayed text of the web page. The features determined by analyzing the content of the web page may include, for example, the number of currency symbols, trademark symbols (e.g., ™), registered trademark symbols (e.g., ®), or copyright symbols (e.g., ©) in text of the web page, the number of times the term "product" or "products" appears in the web page, the number of relatively high term frequency—inverse document frequency ("TFIDF") terms, or the highest TFIDF number in the web page. Other features may be determined from the content of the web page as an alternative to or in addition to those described above.

The adaptive learning machine may analyze the content in combination with the structure of the web page to determine one or more features of the web page. The adaptive learning machine may analyze the content in combination with the structure by determining the structure associated with the displayed text. For example, the adaptive learning machine may determine whether the term "product" that appears in the web page is included in a headline of the web page.

Returning to FIG. 3, after the adaptive learning machine determines the features of the web page, the adaptive learning machine analyzes the features to determine whether the web page is a product page using a page recognition model at step 308. The page recognition model may be a binary classifier that indicates whether a web page is a product page based on the features of the web page.

The adaptive learning machine may generate the page recognition model using labeled web pages and features associated with the labeled web pages as a training set. In particular, the adaptive learning machine may generate the page recognition model by accessing a web page, determining the features associated with the web page, and receiving input from a user specifying a label for the web page. The adaptive learning machine generates the page recognition model using the labeled web pages and their associated features.

Figure 5:
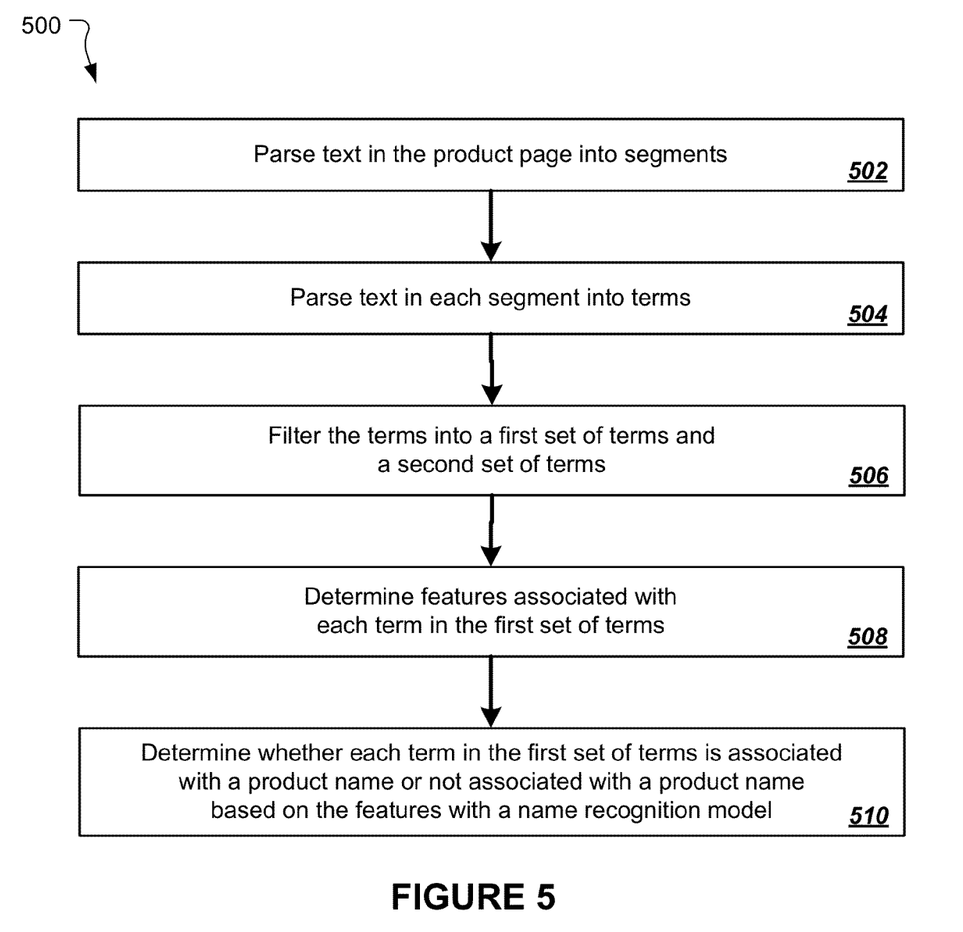
FIG. 5 illustrates an example flowchart 500 for identifying each term in the product page as being associated with a product name or not being associated with a product name.

FIG. 5 illustrates an example flowchart 500 for identifying each term in the product page as being associated with a product name or not being associated with a product name. The adaptive learning machine parses the text in the product page into segments at 502. For each segment, the adaptive learning machine determines a type of segment. The type of segment can include, for example, a link, a headline, a list entry, a table entry, or a sentence. The adaptive learning machine determines the type of segment by, for example, parsing the markup language document of the product page and identifying markup language tags associated with the segment.

The adaptive learning parses the text in each segment into terms at step 504. For each term, the adaptive learning machine determines a type of term. The type of term may be, for example, a noun, a verb, an adverb, an adjective, a number, or a symbol. The adaptive learning determines the type of term by, for example, determining where the term appears in the segment and the type of segment in which the term appears. The adaptive learning machine may determine whether the term is part of a noun phrase that includes two or more terms.

The adaptive learning machine filters terms in the product page into a first set of terms and a second set of term at step 506. Based on the type of term, the adaptive learning machine identifies the term as belonging in the first set of terms or the second set of terms. The first set of terms includes terms identified by the adaptive learning machine as potentially being associated with a product name, and the second set of terms includes terms identified by the adaptive learning machine as not being associated with a product name. For example, the adaptive learning machine may identify terms classified as nouns or numbers as potentially being associated with a product name and thus belonging in the first set of terms. The adaptive learning machine may identify terms classified as verbs or adverbs as not being associated with a product name and thus belonging in the second set of terms.

The adaptive learning machine determines features associated with each term in the first set of terms at 508. The adaptive learning machine determines features associated with each term based on the term, the type of term, the noun phrase that includes the term, and the type of segment in which the term appears. The features may include, for example, the type of term, the capitalization of the first letter of the term, the type of segment in which the term appears, a protection symbol (e.g., ™, ®, ©) following the term, the term appearing in the URL for the product page, or the TFIDF score of the term.

The adaptive learning machine may determine features associated with each term based on the term being a part of a noun phrase. In this instance, the features include, for example, the term being part of a noun phrase, the type of the terms in the noun phrase, the number of each type of term in the noun phrase, the ratio of capitalized terms to non-capitalized terms in the noun phrase, the number of terms in the noun phrase which are part of the URL for the product page, or the average TFIDF score for the noun phrase. For example, in the sentence "Air filter is a new product," "Air filter" is a noun phrase. For the term "filter," the adaptive learning machine determines features for the term itself and for the noun phrase in which the term appears. For the feature of capitalized terms, the adaptive learning machine determines that the feature has a value of zero for the term "filter" and a value of 0.5 for the noun phrase "Air filter." Based on the value of the capitalization feature for the term and the noun phrase, the adaptive learning machine determines that the term "filter" has a capitalization feature value of 0.5. Other features associated with each term may be determined as an alternative or in addition to those describe above.

The adaptive learning machine determines, with a name recognition model, whether each term in the first set of terms is associated with a product name or not associated with a product name based on the features at step 510. The name recognition model may be a binary classifier that determines whether a term is associated with a product name or not associated with a product name based on the features associated with the term. The name recognition model may output the terms identified as being associated with a product name.

The adaptive learning machine may generate the name recognition model using labeled terms and features associated with the labeled terms as a training set. In particular, the adaptive learning machine may generate the name recognition model by extracting terms from a web page, such as a product page, determining the features associated with the terms, and receiving input from a user specifying a label for the term. The adaptive learning machine generates the name recognition model using the labeled terms and their associated features.

Figure 6:
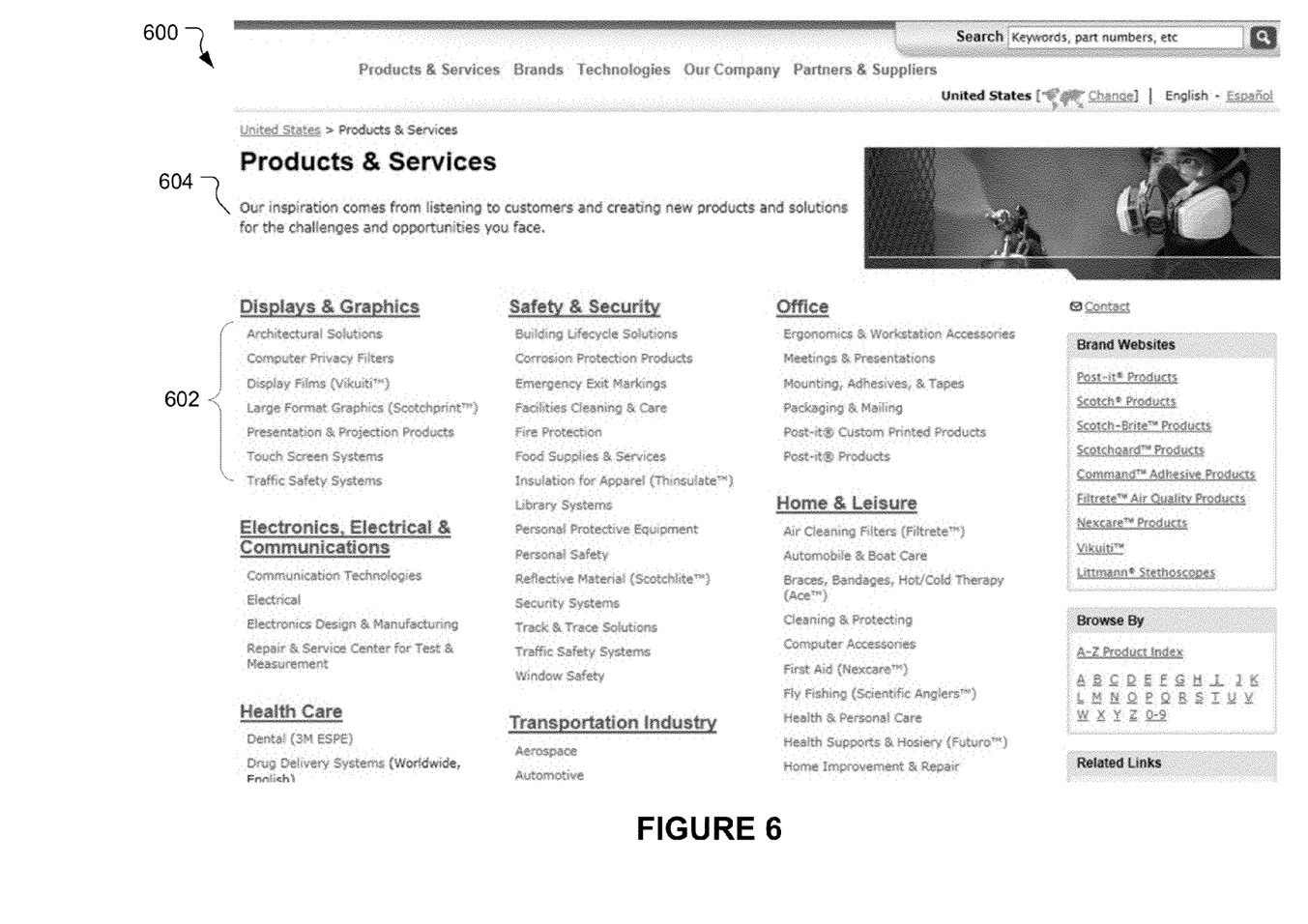
FIG. 6 illustrates an example product page.

FIG. 6 illustrates an example product page 600. Based on analyzing the features associated with the web page 600, the adaptive learning machine determines that the web page 600 is a product page. For example, the adaptive learning machine determines that the web page 600 is a product page based on features indicating that the term "products" appears in the web page and that the term "products" appears at least fifteen times in the web page 600.

After the adaptive learning machine identifies the web page 600 as a product page, the adaptive learning machine identifies each term in the product page as being associated with a product name or not being associated with a product name. For example, the adaptive learning machine identifies each term of the terms 602 as being associated with a product name and each term of the terms 604 as not being associated with a product name. The adaptive learning machine determines that each term of the terms 602 is associated with a product name based on features indicating, for example, that the term is a noun or a number, the term has a capitalized first letter, the term is included in a list segment type, and the term is part of a noun phrase. The adaptive learning machine determines that each term of the terms 604 is not associated with a product name based on features indicating that the term is included in a sentence segment type and the sentence segment type includes terms of a type other than a noun or a number.

A number of implementations have been described. Nevertheless, it will be understood that various modifications may be made. For example, other methods described herein besides or in addition to that illustrated in FIG. 2, 3, or 5 may be performed. Further, the illustrated steps of processes 200, 300, or 500 may be performed in different orders, either concurrently or serially. Further, steps may be performed in addition to those illustrated in processes 200, 300, and 500, and some steps illustrated in processes 200, 300, and 500 may be omitted without deviating from the present disclosure. Accordingly, other implementations are within the scope of the following claims.

What is claimed is:

1. A method performed with a computing system for obtaining information from a set of related electronic documents, the method comprising:

accessing the set of related electronic documents that are each hosted on one or more respective web servers that are accessible through a network, the accessing including retrieving data associated with the set of related electronic documents through the network;

analyzing markup language of an electronic document of the set of related electronic documents to identify markup language tags of the electronic document;

analyzing, using a page recognition module, the markup language tags to identify the electronic document as a product page, the page recognition model generated based on a first machine learning algorithm, and the product page comprising a plurality of terms;

filtering the plurality of terms into a first set of terms and a second set of terms, the first set of terms and the second set of terms including different terms of the plurality of terms, each term in the first set of terms identified as potentially being associated with a product name, and each term in the second set of terms identified as not being associated with a product name;

for each term of the first set of terms, identifying a noun phrase that includes the term and determining one or more features of each of the noun phrase and the term;

for each feature of the one or more features:

determining, for each term of the first of terms, a first feature value of the noun phrase and a second feature value of the term, and         determining, for each term of the first set of terms, an overall feature value for the term based on the first feature value and the second feature value;

identifying each term in the first set of terms as being associated with a product name or not being associated with a product name with a name recognition model, the name recognition model generated based on the overall feature value for each feature of the term; and providing for display on a graphical user interface, one or more of the first set of terms that are identified as being associated with a product name.

2. The method of claim 1, wherein identifying a product page comprises generating the page recognition model by:
accessing an electronic document;
determining features associated with the electronic document;
receiving input specifying a label for the electronic document; and
generating the page recognition model using the labeled electronic document and the features as a training set.

3. The method of claim 1, wherein identifying each term in the first set of terms as being associated with a product name or not being associated with a product name with a name recognition model comprises generating the name recognition model by:
extracting one or more terms from an electronic document;
determining features associated with the one or more terms;
receiving input specifying a label for the one or more terms; and
generating the name recognition model using the labeled terms and the features as a training set.

4. The method of claim 1, wherein identifying a product page comprises:
accessing an electronic document associated with the set of related electronic documents;
determining features associated with the electronic document; and
analyzing the features to determine whether the electronic document is a product page using the page recognition model.

5. The method of claim 4, wherein determining features associated with the electronic document comprises:
analyzing a uniform resource locator, structure, and content associated with the electronic document.

6. The method of claim 5, wherein analyzing the structure associated with the electronic document comprises:
determining at least one of amount of text, length of the longest text section, length of link texts, average link length, average list entry length, average table entry length, number of links, images, tables, or markup language tags, headlines of tables or lists, or a link associated with an image, list, table, or headline in the electronic document.

7. The method of claim 1, wherein filtering the plurality of terms into a first set of terms and a second set of terms comprises:
parsing text in the product page into the plurality of terms;
for each of the plurality of terms, determining a type of the term; and
identifying the term as belonging in the first set of terms or the second set of terms based on the type of the term.

8. The method of claim 7, wherein the type of the term comprises at least one of a noun, a verb, an adverb, an adjective, a number, or a symbol.

9. The method of claim 1, wherein determining one or more features of each of the noun phrase and the term comprises:
parsing text in the product page into one or more segments;
for each segment, determining a type of the segment; and
associating the type of the segment with the term.

10. The method of claim 9, wherein the type of the segment comprises at least one of a link, a headline, a list entry, a table entry, or a sentence.

11. A non-transitory computer storage medium encoded with a computer program, the program comprising instructions that when executed by one or more computers cause the one or more computers to perform operations comprising:
accessing a set of related electronic documents;
analyzing markup language of an electronic document of the set of related electronic documents to identify markup language tags of the electronic document;
analyzing, using a page recognition module, the markup language tags to identify the electronic document as a product page, the page recognition model generated based on a first machine learning algorithm, and the product page comprising a plurality of terms;
filtering the plurality of terms into a first set of terms and a second set of terms, the first set of terms and the second set of terms including different terms of the plurality of terms, each term in the first set of terms identified as potentially being associated with a product name, and each term in the second set of terms identified as not being associated with a product name;
for each term of the first set of terms, identifying a noun phrase that includes the term and determining one or more features of each of the noun phrase and the term;
for each feature of the one or more features:
determining, for each term of the first of terms, a first feature value of the noun phrase and a second feature value of the term, and
determining, for each term of the first set of terms, an overall feature value for the term based on the first feature value and the second feature value;
identifying each term in the first set of terms as being associated with a product name or not being associated with a product name with a name recognition model, the name recognition model generated based on the overall feature value for each feature of the term; and
providing for display on a graphical user interface, one or more of the first set of terms that are identified as being associated with a product name.

12. The non-transitory computer storage medium of claim 11, wherein identifying a product page comprises generating the page recognition model by:
accessing an electronic document;
determining features associated with the electronic document;
receiving input specifying a label for the electronic document; and
generating the page recognition model using the labeled electronic document and the features as a training set.

13. The non-transitory computer storage medium of claim 11, wherein identifying each term in the first set of terms as being associated with a product name or not being associated with a product name with a name recognition model comprises generating the name recognition model by:
extracting one or more terms from an electronic document;
determining features associated with the one or more terms;
receiving input specifying a label for the one or more terms; and
generating the name recognition model using the labeled terms and the features as a training set.

14. The non-transitory computer storage medium of claim 11, wherein identifying a product page comprises:
accessing an electronic document associated with the set of related electronic documents;
determining features associated with the electronic document; and
analyzing the features to determine whether the electronic document is a product page using the page recognition model.

15. The non-transitory computer storage medium of claim 14, wherein determining features associated with the electronic document comprises:
analyzing a uniform resource locator, structure, and content associated with the electronic document.

16. The non-transitory computer storage medium of claim 15, wherein analyzing the structure associated with the electronic document comprises:
determining at least one of amount of text, length of the longest text section, length of link texts, average link length, average list entry length, average table entry length, number of links, images, tables, or markup language tags, headlines of tables or lists, or a link associated with an image, list, table, or headline in the electronic document.

17. The non-transitory computer storage medium of claim 11, wherein filtering the plurality of terms into a first set of terms and a second set of terms comprises: parsing text in the product page into the plurality of terms;
for each of the plurality of terms, determining a type of the term; and
identifying the term as belonging in the first set of terms or the second set of terms based on the type of the term.

18. The non-transitory computer storage medium of claim 11, wherein determining one or more features of each of the noun phrase and the term comprises:
parsing text in the product page into one or more segments;
for each segment, determining a type of the segment; and
associating the type of the segment with the term.

19. A system of one or more computers configured to perform operations comprising:
accessing a set of related electronic documents;
analyzing markup language of an electronic document of the set of related electronic documents to identify markup language tags of the electronic document;
analyzing, using a page recognition module, the markup language tags to identify the electronic document as a product page, the page recognition model generated based on a first machine learning algorithm, and the product page comprising a plurality of terms;
filtering the plurality of terms into a first set of terms and a second set of terms, the first set of terms and the second set of terms including different terms of the plurality of terms, each term in the first set of terms identified as potentially being associated with a product name, and each term in the second set of terms identified as not being associated with a product name;
for each term of the first set of terms, identifying a noun phrase that includes the term and determining one or more features of each of the noun phrase and the term;
for each feature of the one or more features:
determining, for each term of the first of terms, a first feature value of the noun phrase and a second feature value of the term, and
determining, for each term of the first set of terms, an overall feature value for the term based on the first feature value and the second feature value;
identifying each term in the first set of terms as being associated with a product name or not being associated with a product name with a name recognition model, the name recognition model generated based on the overall feature value for each feature of the term; and
providing for display on a graphical user interface, one or more of the first set of terms that are identified as being associated with a product name.

20. The system of claim 19, wherein identifying a product page comprises generating the page recognition model by:
accessing an electronic document;
determining features associated with the electronic document;
receiving input specifying a label for the electronic document; and
generating the page recognition model using the labeled electronic document and the features as a training set.

21. The system of claim 19, wherein identifying each term in the first set of terms as being associated with a product name or not being associated with a product name with a name recognition model comprises generating the name recognition model by:
extracting one or more terms from an electronic document;
determining features associated with the one or more terms;
receiving input specifying a label for the one or more terms; and
generating the name recognition model using the labeled terms and the features as a training set.

22. The system of claim 19, wherein identifying a product page comprises:
accessing an electronic document associated with the set of related electronic documents;
determining features associated with the electronic document; and
analyzing the features to determine whether the electronic document is a product page using the page recognition model.

23. The system of claim 22, wherein determining features associated with the electronic document comprises:
analyzing a uniform resource locator, structure, and content associated with the electronic document.

24. The system of claim 23, wherein analyzing the structure associated with the electronic document comprises:
determining at least one of amount of text, length of the longest text section, length of link texts, average link length, average list entry length, average table entry length, number of links, images, tables, or markup language tags, headlines of tables or lists, or a link associated with an image, list, table, or headline in the electronic document.

25. The system of claim 19, wherein filtering the plurality of terms into a first set of terms and a second set of terms comprises:
parsing text in the product page into the plurality of terms;
for each of the plurality of terms, determining a type of the term; and
identifying the term as belonging in the first set of terms or the second set of terms based on the type of the term.

26. The system of claim 19, wherein determining one or more features of each of the noun phrase and the term comprises:
parsing text in the product page into one or more segments;
for each segment, determining a type of the segment; and
associating the type of the segment with the term.

* * * * *